[11] 3,589,792

| [72] | Inventors | Georg Ku... Karlsruhe; Klaus Speckis, Eppelheim, both of, Germany |
|---|---|---|
| [21] | Appl. No. | 867,235 |
| [22] | Filed | Oct. 17, 1969 |
| [45] | Patented | June 29, 1971 |
| [73] | Assignee | Eltro GmbH & Co. Heidelberg, Germany |
| [32] | Priority | Oct. 17, 1968 |
| [33] | | Germany |
| [31] | | P 18 03 608.3 |

[54] OSCILLATING DEVICE FOR SWIVEL-MOUNTED MIRROR
8 Claims, 3 Drawing Figs.

[52] U.S. Cl. ........................................... 350/7, 178/7.6
[51] Int. Cl. ........................................... G02b 17/00

.............................. 350/6, 7, 172, 285; 178/7.6; 250/234, 135; 74/25, 40

[56] References Cited
UNITED STATES PATENTS

| 1,702,195 | 2/1929 | Centeno | 350/285 |
| 2,792,741 | 5/1957 | Mazzon | 350/285 |
| 2,930,845 | 3/1960 | Yonemoto | 350/7 |
| 3,353,022 | 11/1967 | Schwartz | 350/6 |

*Primary Examiner* — David Schonberg
*Assistant Examiner* — Michael J. Tokar
*Attorney* — Waters, Roditi, Schwartz & Nissen

ABSTRACT: A device for the production of sharply limited oscillations of a swivel-mounted mirror, especially for opto-electronic scanners comprises a crank drive, whose pushrod incorporates a flexible drag link. The oscillating movements of the mirror are limited by abutments in which deviations of the deflections of the mirror from the stroke of the crank drive are permitted by the presence of the flexible drag link.

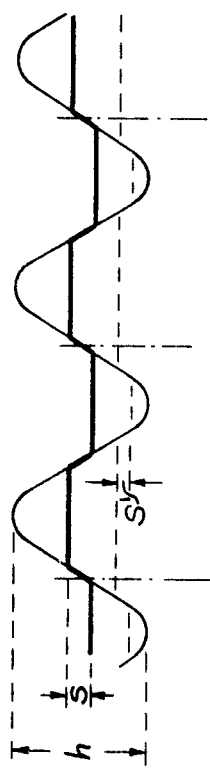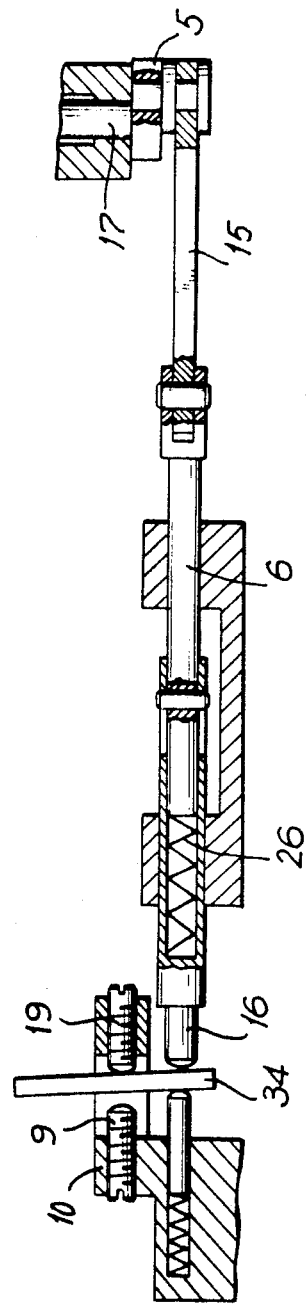

OSCILLATING DEVICE FOR SWIVEL-MOUNTED MIRROR

The invention relates to an oscillating device for a swivel-mounted mirror, especially for oscillating a mirror dealing with line shift in opto-electronic scanners. The oscillations of the oscillating device which effect the transition of the scanning from one line to the next have to be as sharply defined as possible, that is, the diagram of displacement with respect to time should approach a rectangular form as closely as possible. This requirement is postulated because curve-offs are synonymous with leakage paths.

The object of the invention is to provide an oscillating device which complies with the above-mentioned requirements, namely that the oscillations are sharply defined.

According to the invention, a crank drive is used for producing the oscillations of the swivel-mounted mirror and a flexible drag link is incorporated in a pushrod of the crank drive.

The incorporation of the flexible drag link in the pushrod offsets the constraint between the swiveling of the mirror and the revolution of the crank to the extent that the swivel sweep now no longer has to equal the crank diameter. This circumstance can thus be utilized to control the swivel sweep both in length and position. In FIG. 1 the oscillator pushrod path is denoted by $s$ and the crank stroke by $h$.

In its simplest form, this effect can be obtained by using abutments to limit the oscillations of the mirror. The deviation of the deflections of the mirror from the crank drive stroke is accommodated by the flexible drag link.

The abutments are adjustable and can be preset at the outset. The mirror will then always execute identical oscillations as determined by the abutments. In view of the extreme precision required with opto-electronic scanning devices, arrangements are made for adjusting the mirror. According to a further feature of the invention the abutments are made adjustable. Adjustability offers the further advantage that the oscillation can be temporarily dephased in regard to the motion of the crank, that is, speaking broadly, it can be shifted to the beginning or to the end of the crank motion (see $S$ in FIG. 1).

The stroke of the pushrod is in all cases less than the stroke produced by the motion of the crank. It is expedient in a number of cases for the adjustability of the oscillation to range from zero to approximately the length of the stroke. This can be readily accomplished mechanically by suitable dimensioning of the spring link between the two portions of the pushrod.

The temporary shift of the swiveling motions in relation to the movements of the crank is especially advantageous when in an opto-electronic instrument working with two mirrors, the movements of the line scanning mirror are controlled by a cam driven by an electric motor, while the movements of the tilting mirror for the line shift are generated by a device according to the present invention. It is also advantageous if the cam and the crank drive are both driven from the same motor.

BRIEF DESCRIPTION OF THE DRAWING

FIG. 1 is a graphical illustration showing stroke of a swivel-mounted mirror with respect to time in dark solid lines and stroke of a crank drive for the mirror in lighter lines;

FIG. 3 is a vertical section through the oscillating mirror drve.

DETAILED DESCRIPTION OF THE INVENTION

Figure 2:
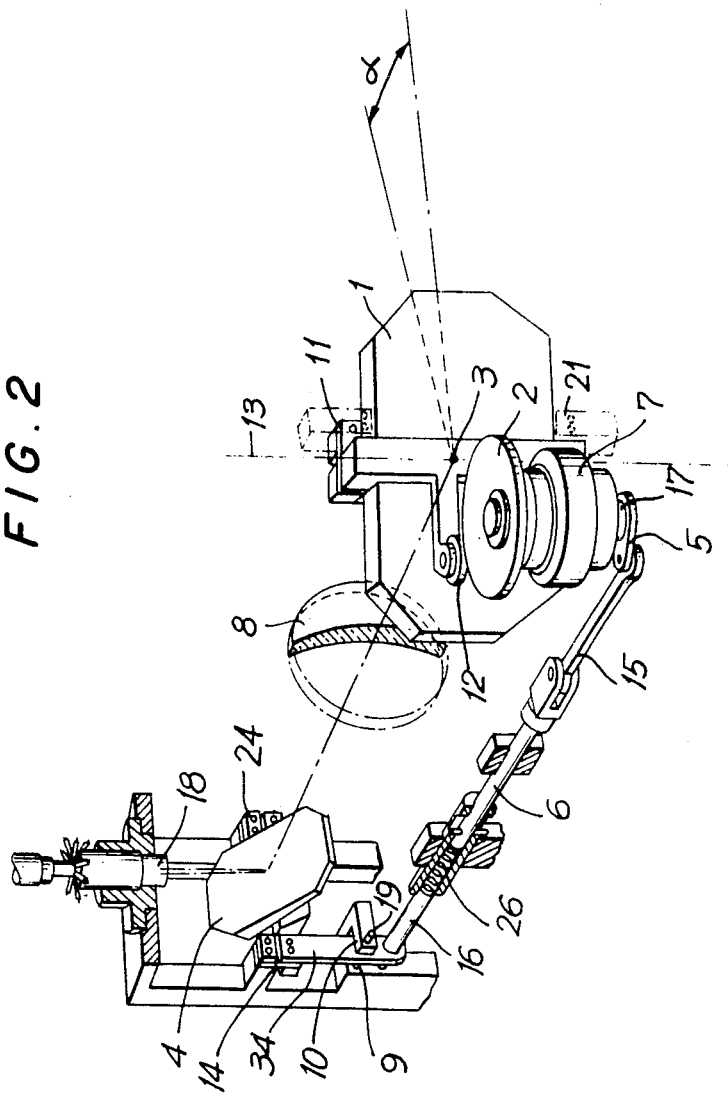
FIG. 2 is a perspective view of the overall device according to the invention.

In FIGS. 2 and 3 a device provided with the invention is shown as an example. FIG. 2 shows a perspective view of the whole arrangement, FIG. 3 a vertical section through the oscillating mirror drive.

Referring to FIG. 2, wherein is shown a swiveling mirror 1 for scanning lines, the mirror 1 being swivel-mounted at points 11 and 21 for pivotal movement about an axis 13 passing through the center of gyration 3. The mirror is guided by a roller 12 engaging the periphery of an eccentric disc 2, the roller being permanently pressed against disc 2 by a spring (not shown in the drawing). The eccentric disc 2 is mounted on a shaft 17 of an electric motor 7 and is driven in rotation by the shaft 17. On each revolution of the disc, the mirror 1 executes an oscillation through an $\alpha$ about axis 13. The angle $\alpha$, corresponds to the length of one scanning line. The image points thus picked up are collected by a collimator lens 8 and projected onto a second mirror 4. The rays reflected from mirror 4 are fed to a cell 18, from which they are converted in known manner into electronic signals.

For transit from one line to the next, the tilting mirror 4 has to be tilted at a given time. For this purpose, the mirror 4 is swivel-mounted at 14 and 24. The tilting motion of mirror 4 is obtained by a crankdrive connected with motor shaft 17 also provided with an eccentric disc. The crank drive comprises a crank 5, a connecting rod 15, a pushrod in two parts 6 and 16, and an intermediate flexible link 26 inserted between the two pushrod parts. The pushrod part 16 has an outer end in contact with an arm 34, which in turn is firmly connected to mirror 4 and thus transmits the movements of the pushrod part 16 to mirror 4. To limit the oscillations of the mirror, two setscrews 9 and 19 are arranged directly above the impact point of pushrod portion 16 (FIG. 3), lying parallel to the centerline of pushrod 16 but threaded in mutually opposite directions into a lug 10. The lug 10 has a central recess into which arm 34 is fitted. The arm 34 is connected to the mirror 4 to produce oscillation of mirror 4 as the arm 34 is oscillated. By regulating screws 9 and 19, the stroke of arm 34 can be regulated. Arm 34 is urged by the action of a spring-loaded pin against the end of screw 19. The arm 34 can move under the action of pushrod 16 only so far to the left until it contacts screw 9. The unexpended thrust of pushrod 6 is absorbed by the flexible link 26. By adjustment of screws 9 and 19, it is possible to vary the stroke of lever 34 and accordingly the degree of swivel of mirror 4, as desired, within the stroke of the crank 5. The correction can extend not only to the magnitude of the swivel motion (angle $\alpha$) but also to its temporary position in regard to the crank motion (see FIG. 1 $S$).

What we claim is:

1. Apparatus comprising a swivel-mounted mirror, a crank drive coupled to said mirror to drive the same with oscillation, said crank drive including a pushrod with a given stroke, a flexible drag link in said pushrod, means coupling said mirror and pushrod for transmitting oscillation to said mirror from the stroke of the pushrod, said means including adjustment members for regulating the oscillatory stroke of the mirror, said flexible drag link absorbing the differences between the stroke of the pushrod and the stroke of the mirror, a second swivel-mounted mirror, the first said mirror being provided for line shift, the second mirror for line scanning and for reflecting an image to the first said mirror, an electric motor, and an eccentric disc driven by said motor and coupled with the second mirror to oscillate the same, said motor being coupled to said crank drive to drive the latter whereby the mirrors are driven conjointly by said motor.

2. Apparatus as claimed in claim 1 wherein said adjustment members comprise abutment means for controlling the magnitude of the oscillatory stroke of said first mirror.

3. Apparatus as claimed in claim 2 wherein said means coupling said mirror and pushrod comprises an oscillatory arm connected with said mirror for common pivotal movement therewith, said pushrod being displaceable to contact said arm and pivotably move the same.

4. Apparatus as claimed in claim 3 comprising means acting on said arm to urge the same against said pushrod whereby the arm and mirror undergo oscillatory movement during stroke of the pushrod.

5. Apparatus as claimed in claim 4 wherein said abutment means comprises first and second abutments positioned on opposite sides of said arm to limit pivotal movement thereof.

6. Apparatus as claimed in claim 6 wherein said abutments are constituted by threaded pins adjustable in position towards and away from said arm.

7. Apparatus as claimed in claim 6 wherein said pushrod comprises first and second parts, said drag link connecting said parts together.

8. Apparatus as claimed in claim 1 comprising a collimating lens between said mirrors for collecting and projecting an image reflected from the second mirror to the first mirror, and a cell for receiving reflected rays from the first mirror.